(12) United States Patent
Watanabe et al.

(10) Patent No.: US 6,712,522 B2
(45) Date of Patent: Mar. 30, 2004

(54) PERFORATED SLEEVE CONNECTOR

(75) Inventors: Eiji Watanabe, Kanagawa (JP); Kenji Nakamura, Tokyo (JP)

(73) Assignee: Oudensha Co., Ltd., Kanagawa (JP)

( * ) Notice: Subject to any disclaimer, the term of this patent is extended or adjusted under 35 U.S.C. 154(b) by 221 days.

(21) Appl. No.: 10/067,329

(22) Filed: Feb. 7, 2002

(65) Prior Publication Data

US 2003/0059169 A1 Mar. 27, 2003

(30) Foreign Application Priority Data

Sep. 21, 2001 (JP) ........................................ 2001-287965
Sep. 28, 2001 (JP) ........................................ 2001-301139

(51) Int. Cl.$^7$ .............................. G02B 6/36; C25D 1/02
(52) U.S. Cl. .............................. 385/60; 205/73; 205/79; 385/72
(58) Field of Search .............................. 385/60, 72, 58, 385/70, 55, 78; 205/67, 73, 75, 78, 79

(56) References Cited

U.S. PATENT DOCUMENTS

| | | | | |
|---|---|---|---|---|
| 2,287,122 A | * | 6/1942 | Norris | 205/73 |
| 3,763,030 A | * | 10/1973 | Zimmer | 204/281 |
| 4,024,045 A | * | 5/1977 | Thierstein | 204/281 |
| 5,703,982 A | * | 12/1997 | Takizawa | 385/78 |
| 6,174,424 B1 | * | 1/2001 | Wach et al. | 205/73 |
| 6,419,810 B1 | * | 7/2002 | Tanaka et al. | 205/73 |

* cited by examiner

Primary Examiner—Rodney Bovernick
Assistant Examiner—Mike Stahl
(74) Attorney, Agent, or Firm—Young & Thompson

(57) ABSTRACT

A cylindrical sleeve connector for mounting ferrules retaining optical fibers therein is formed with a plurality of perforations arranged in a given pattern so as to be elastically deformable within in a specified elastic region. The sleeve connector is produced, using electroforming process, on a cylindrical electroforming mandrel comprising a conductive rod with external surface texture that is equivalent to required internal surface texture of the sleeve connector and a non-conductive layer formed on the conductive rod so as to provide non-conductive segments identical in configuration with the perforations and arranged in conformity with the given pattern of perforations of the cylindrical sleeve connector.

8 Claims, 7 Drawing Sheets

PERFORATED SLEEVE CONNECTOR

BACKGROUND OF THE INVENTION

1. Field of the Invention

The present invention relates to a sleeve connector for joining optical fibers retained by ferrules in close or contacting relationship, and, more particularly, to a sleeve-shaped optical fiber connector that is formed with perforations arranged in a given pattern so as to be elastically deformable in a radial direction.

2. Description of Related Art

Many optical fiber connector designs in use today in telecommunication technology contain precision cylindrical ceramic or glass ferrules that are mounted in an optical fiber connector in order to join optical fibers for signal transmission. Bare ends of optical fibers are bonded in close fitting axial bores in these ferrules and the ferrule tips are polished to provide low insertion loss and back reflection connection. The connector used with the ferrules are formed in the shape of split sleeve. One of the central functions of such a split sleeve connector is the centering and aligning the ferrules. Alignment of the ferrules is essential in the standpoint of bringing the centers of the optical fibers into alignment in order to provide low insertion loss. Another central function of the split sleeve connector is to provide appropriate force for clamping the ferrules, in other words, to allow the ferrules to be pull out with intended drawing force.

There are, at present, many different types of split sleeve connectors in use, all of which are aimed at achieving clamp of ferrules with desirable force, as shown in FIGS. 10(A) and 10(B) by way of example.

FIG. 10(A) shows one of conventional split sleeve connectors 1 having a single axial slit 1' along the entire length. The split sleeve connector 1, that is made of metal or zirconia, is formed by slitting a cylindrical metal or zirconia sleeve along its entire length or by pressing a metal sheet to a cylindrical configuration having a longitudinal slit. Considering the split sleeve connector in terms of clamping mechanism, the split sleeve connector 1 is elastically deformed symmetrically with the center axis of the split sleeve connector 1 by a ferrule or ferrules when the ferrules are inserted into opposite ends of the split sleeve connector 1. The elastic deformation provides the slit sleeve connector 1 with radial restoration force as a clamping force against the ferrules and clamp ferrules. The split sleeve connector 1 changes in its internal diameter due to the elastic deformation, resulting deterioration of roundness thereof. This causes uneven surface contact between the internal surface of the split sleeve connector 1 and external surfaces of the ferrules, which is one of causes for misalignment between the ferrules, and hence optical fibers, in the split sleeve connector 1.

FIG. 10(B) shows another conventional split sleeve connector 2 having a plurality of, e.g. six in this example, axial slits 2' arranged at regular angular intervals. These slits 2' is beyond half as long as the entire axial length of the split sleeve connector 2 and extend alternately from opposite ends of the split sleeve connector 2. Specifically, the split sleeve connector 2 is formed three slits 2a that extend from one of the opposite ends of the split sleeve connector 2 and are separated from one another by 120° intervals and three slits 2a that extend from another end of the split sleeve connector 2 and are separated from one another by 120° intervals and from the slits 2' extending from the one end o the split sleeve connector 2 by 60° intervals, respectively.

The split sleeve connector with more than two slits arranged at regular angular intervals and extending alternately from the opposite ends thereof is insufficient in elasticity and, however, inevitably result in that the split sleeve connector changes its internal diameter, which leads to deterioration of roundness.

These prior art split sleeve connectors are undesirable for axial alignment of the ferrules retaining optical fibers positioned and maintained in butting relationship because of insufficient elasticity and a change in roundness, which results in a drop in light transmission efficiency.

SUMMARY OF THE INVENTION

It is therefore an object of the present invention to provide a sleeve connector formed with perforations that has an elastic region covering required elastic deformation.

It is another object of the present invention to provide a sleeve connector formed with perforations that is free from a change in roundness and provides uniform surface contact between ferrules mounted therein.

It is a further object of the present invention to provide a process of producing a sleeve connector formed with perforations using an electroforming process which realizes low production costs.

The foregoing objects of the present invention are achieved by a sleeve connector formed with perforations that is directly produced in the form of a metal tube on an electroforming mandrel using an electroforming process, The electroforming mandrel is made up from a conductive rod which has an external surface and an external diameter finished to those required for the sleeve connector and is formed with a non-conductive layer thereon so as to provide non-conductive segments identical in configuration with the perforations of the sleeve connector and arranged in conformity with the given pattern of perforations of the sleeve connector.

The sleeve connector formed with perforations can be provided with any elasticity, i.e., putting it the other around, required rigidity, as required by selecting the pattern of perforation arrangement, the configuration of perforation, the number of rows of perforations, the number of perforations, the aperture area ratio (a ratio of the total area of perforations relative to the entire surface area of sleeve connector), the thickness of sleeve connector and the like according to applications of the sleeve connector. As the sleeve connector causes all-round radial elastic deformation in its own elastic region which is different from elastic deformation caused in the conventional slit sleeve connector due to local expansion of a slit of the sleeve connector, the sleeve connector always maintains its given roundness and interior diameter with respect to ferrules. As a result, the sleeve connector joins ferrules, and hence optical fibers retained by the ferrules, in close or contacting relationship, without an error in axial alignment and holds them with stable and reliable clamping force.

It is quite easy to finish an external surface of the electroforming mandrel to a diameter and surface texture as compared with finishing an internal surface of a hollow cylindrical tube to a required internal diameter and surface texture. The use of the electroforming mandrel formed with a number of electrodeposit sections for sleeve connectors makes mass production of the sleeve connectors with high efficiency and at low costs.

BRIEF DESCRIPTION OF THE DRAWINGS

The foregoing and other objects and features of the present invention will be understood from the following description in accordance with preferred embodiments thereof when reading in connection with the accompanying drawings, and wherein.

DETAILED DESCRIPTION OF THE PREFERRED EMBODIMENTS

Figure 1:
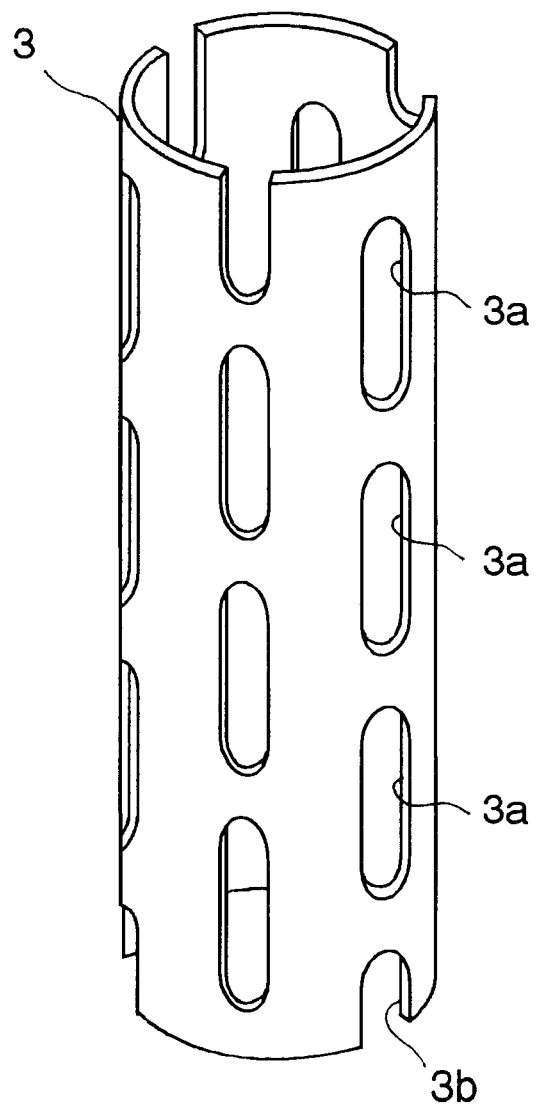
FIG. 1 is a perspective side view of a sleeve connector in accordance with a preferred embodiment of the present invention.

Referring to the drawings in detail and, in particular, to FIG. 1 showing a sleeve connector 3 in accordance with an embodiment of the present invention that is produced using an electroforming process, the sleeve connector 3 is formed with a plurality of round-ended perforations 3a, 3b arranged in a predetermined geometric pattern. By way of example, the sleeve connector 3 shown in FIG. 1 has six axial rows of perforations 3a and 3b arranged at regular circumferential angular intervals of 60°. Each row includes three complete perforations 3a and a half perforations 3b arranged at regular axial intervals. These rows of perforations 3a, 3b are alternately shifted in opposite axial directions so that the half perforations 3b alternately extend from opposite ends of the sleeve connector 3. Accordingly, the sleeve connector 3 at each of opposite ends is formed with three half perforations 3b separated at circumferential angular intervals of 120°.

Dimensions of the sleeve connector 3, such as the pattern of perforation arrangement, the configuration of perforation, the number of perforation rows, the number of perforations, the aperture area ratio (a ratio of the total area of perforations to the entire surface area of sleeve connector), the thickness and the like, are defined depending the requirements of elasticity according to the objective of the sleeve connector.

In the case where the sleeve connector 3 is used for connecting thin round filamentary members such as optical fibers and optical fiber retaining ferrules, the sleeve connector 3 has an internal surface finished to a high grade of surface texture such as meeting a design requirement for a needle diameter of needle bearings.

The sleeve connector 3 having a high grade of internal surface texture is produced using an electroforming process of the present invention.

The electroforming process itself is well known in the electroplating art. However, the process of producing the sleeve connector 3 includes a preparatory step of providing an electroforming mandrel on which a non-conductive layer having a geometric pattern meeting the pattern of perforation arrangement is formed as shown in FIG. 2.

Figure 2:
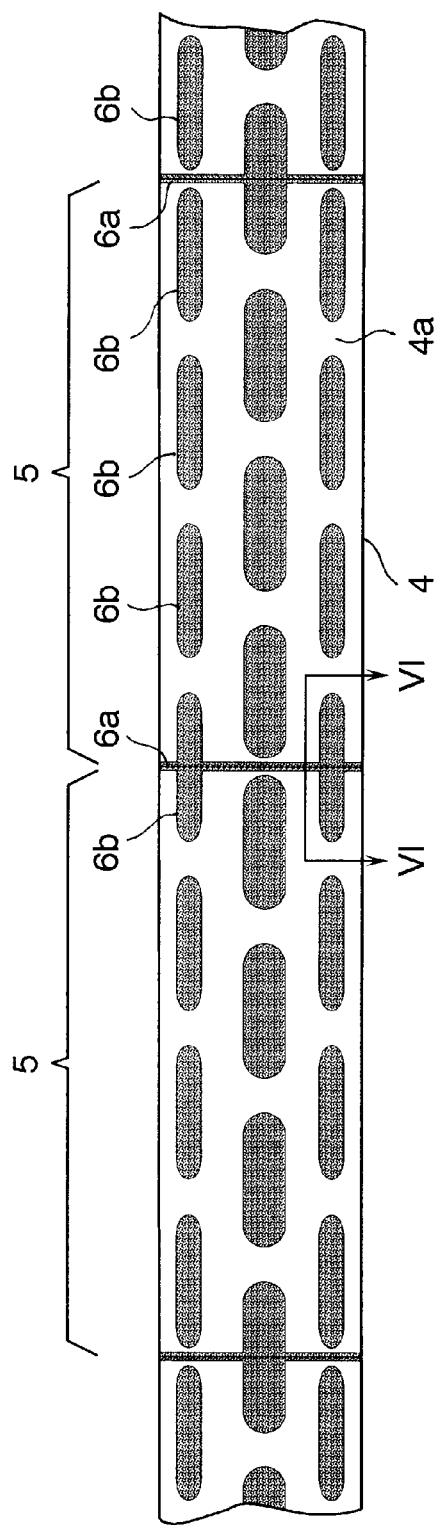
FIG. 2 is a side view of an electroforming mandrel used in an electroforming process of producing the sleeve connector.

Referring to FIG. 2 showing the electroforming mandrel 10 that is used to produce the sleeve connector 3, the electroforming mandrel 10 comprises a thin conductive rod 4 and a non-conductive layer 5 formed in a given pattern on the conductive rod 4. The conductive rod 4 has an external diameter precisely equal to the internal diameter of the sleeve connector 3 and an external surface texture finished to a grade as high as meeting a surface texture design requirement for, for example, a needle diameter for needle bearings, i.e. the grade of surface-texture of four triangle finish symbols defined by Japanese Industrial Standard, or higher.

The non-conductive layer 5 is patterned with a plurality of non-conductive circumferential annular segments 6a and six rows of non-conductive round-ended segments 6b. Each adjacent non-conductive circumferential annular segments 6a are separated in an axial direction at a distance equal to a given length of the sleeve connector 3 to define a plurality of sections. Each of the round-ended segments 6b has the same configuration as the complete round-ended perforation 3a. The six rows of non-conductive round-ended segments 6b are arranged at circumferential angular intervals of 60° and alternately shifted in the axial direction so that the round-ended segments 6b are intersected every other row by the circumferential annular segments 6a. Accordingly, each row includes three complete round-ended segments 6b and one half round-ended segment 6b. The half round-ended segments 6b of each section alternately appears at opposite ends of the section. The non-conductive layer 5 thus formed has the non-conductive segments 6b arranged in the same geometric pattern as the pattern of perforation arrangement of the sleeve connector 3 in each section.

The conductive rod 4 is left bare conductive areas 4a for electrodeposition thereon in the section between the respective adjacent non-conductive circumferential annular segments 6a. That is, the electroforming mandrel 4 is formed with a plurality of electrodeposion sections 4a, one for one sleeve connector 3, between each adjacent non-conductive circumferential annular segments 6a.

The patterned non-conductive layer 5 may be formed by any known manner such as printing, a photographic process using a photo-resist and the like.

The following description will be directed to the process of producing the sleeve connector 3 according to the present invention with reference to FIGS. 3 to 6.

Figure 3:
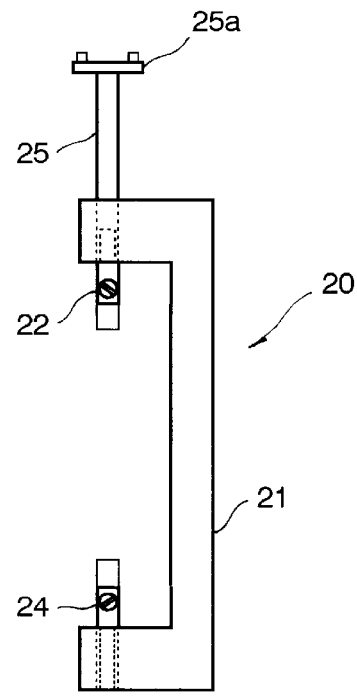
FIG. 3 is a side view of a mandrel holder for holding the electroforming mandrel during the electroforming process.
Figure 4:
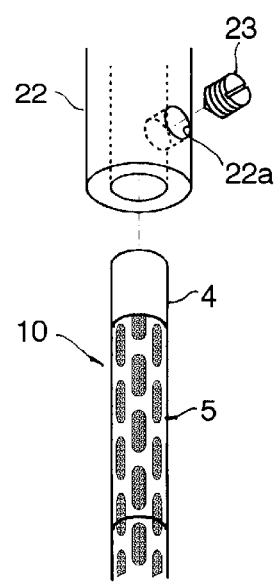
FIG. 4 is an enlarged view of upper part of the mandrel holder.

As shown in FIG. 3, before producing sleeve connectors 3 on the electroforming mandrel 10 using the electroforming process, the electroforming mandrel 10 prepared as described above is attached to a non-conductive mandrel holder 20. The mandrel holder 20 comprises a generally U-shaped holding body 21, upper and lower holding fixtures 22 and 24 detachably screwed into upper and lower arms of the holding body 21 and a connecting rod 25 having a coupling joint 25a. Each of the upper and lower holding fixtures 22 and 24 has a bore having an internal diameter suitable for receiving one of opposite ends of the electroforming mandrel 10. The coupling joint 25 is used to couple the holding body 21 to an electric motor 35 (see FIG. 5). At least the upper holding fixture 22 and the coupling joint 25 are made of conductive members. As shown in FIG. 4, after inserting the mandrel 10 at a lower end to the lower holding fixture 24, the upper holding fixture 22 is adjusted so as to receive the upper end of the electroforming mandrel 10 at the upper end. A fixing screw 23 is fastened into a threaded through bore 22a of the upper holding fixture 22 so as thereby to fix the electroforming mandrel 10 to the holding body 21.

Figure 5:
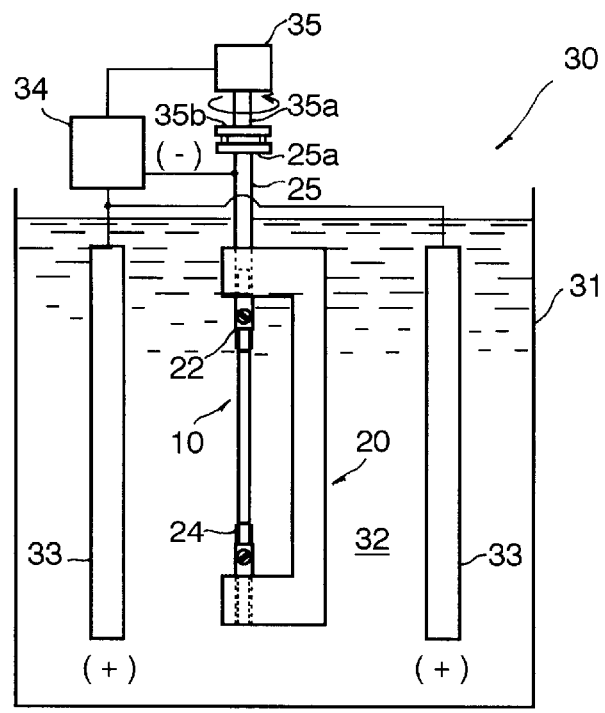
FIG. 5 is a schematic view of an electroforming apparatus that is used to producing the sleeve connector on the electroforming mandrel.

Referring to FIG. 5 showing an electroforming apparatus 30 for producing sleeve connectors 3 on the electroforming mandrel 10, the electroforming apparatus 30 comprises an electrolytic fluid vessel 31 in which an electrolyte fluid 32 is contained, a plurality of nickel electrodes 33 which are the anode under electrodeposition conditions, a power supply 34 and the drive motor 35 with its shaft 35a having a coupling joint 35b. The power supply 34 is connected to the nickel electrodes 33, the conductive connecting rod 25 and the drive motor 35

The mandrel holder 5 with the electroforming mandrel 20 attached thereto is coupled to the drive motor 35 through coupling between the coupling joints 25a and 35b. The power supply 34 supplies a commercial direct current between the anode and cathode, i.e. the nickel electrodes 33 and the electroforming mandrel 20 held by the mandrel holder 20 through the connecting rod 25. The power supply 34 also supplies a commercial direct current to the drive motor 35. When the electroforming process starts, the drive motor 35 is actuated to rotate the mandrel holder 5 with the electroforming mandrel 20 attached thereto in the electrolyte fluid 32.

A conventional electroforming process is implemented to deposit a cylindrical metal layers 12 in the electrodeposition sections 4a on the electroforming mandrel 10, respectively, while the electroforming mandrel 10 rotates. The electroformed metal layers 12 are separated in the axial direction by the non-conductive circumferential annular segments 6a. After completion of the electroforming process, the electroformed metal layer 12 is removed from the conductive rod 4 as separated electroformed sleeve connectors 3, together with the non-conductive layer 5.

The plurality of electrodes 33 are positioned so as to prevent the electroformed cylindrical metal layer 12 from being uneven in wall thickness over the electrodeposition sections 4a. Electroforming conditions are established so as to provide the electroformed sleeve connectors 3, with an internal compressive stress suitable for making it easy to remove the electroformed sleeve connectors 3 from the conductive rod 4. An desired internal compressive stress is realized by controlling the density of electrolyte fluid, the hydrogen exponent (pH) of electrolyte fluid, the density of applied electroforming current, and additives.

Figure 6:
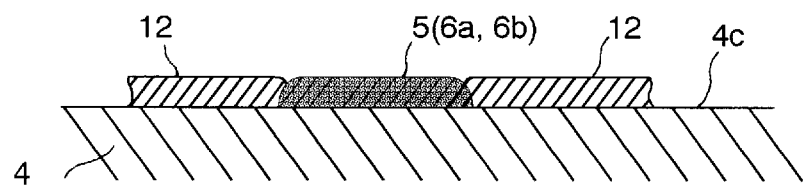
FIG. 6 is a cross sectional view of part of the electroforming mandrel on which a metal layer is formed.

A plurality of the electroforming mandrels 10 may be employed at one try of the electroforming process FIG. 6 shows a cross section of part of the non-conductive circumferential annular segments 6a of the patterned non-conductive layer 5 formed on the conductive rod 4. The circumferential annular segments 6a has opposite side edges convexly chamfered or rounded. In the electroforming process, while a metal layer 12 is gradually built up on the electrodeposition section 4a configured complementarily to the pattern of perforation arrangement. The thickness of the electroformed metal layer 12 can be controlled to a given thickness by implementing the electroforming process under specified controls. During building up of the metal layer 12, the opposite edge of the metal layer 12 on the electrodeposition section 4a is transferred in configuration from the convexly chamfered or rounded edges of the circumferential annular segment 6a of the non-conductive layer 5, respectively.

When the electroforming process is completed, the electroformed metal layer 12 is removed, together with the non-conductive layer 5, from the electroforming mandrel 10. The resultant products are cylindrical metal sleeve connectors formed with perforations 3a, 3b arranged in the given pattern. This metal sleeve connector at its internal surface is finished to the same surface texture as the conductive rod 4. In addition, the metal sleeve connector at opposite ends is provided with inwardly chamfered or rounded walls. The non-conductive rod 4 can be repeatedly used to provide the electroforming mandrel 10.

The sleeve connector with the opposite end walls formed in chamfered or rounded configuration has no necessity of additionally machining the sleeve connector to form insertion guide surface at the opposite end walls and removing flashes that are produced at the opposite end walls by the additional machining.

Figure 7A:
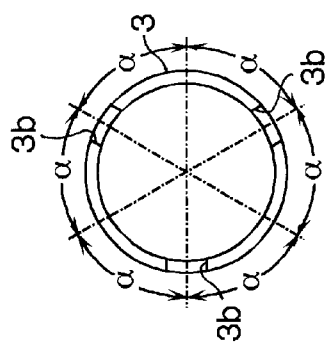
FIG. 7A is a front view showing details of the sleeve connector.
Figure 7B:
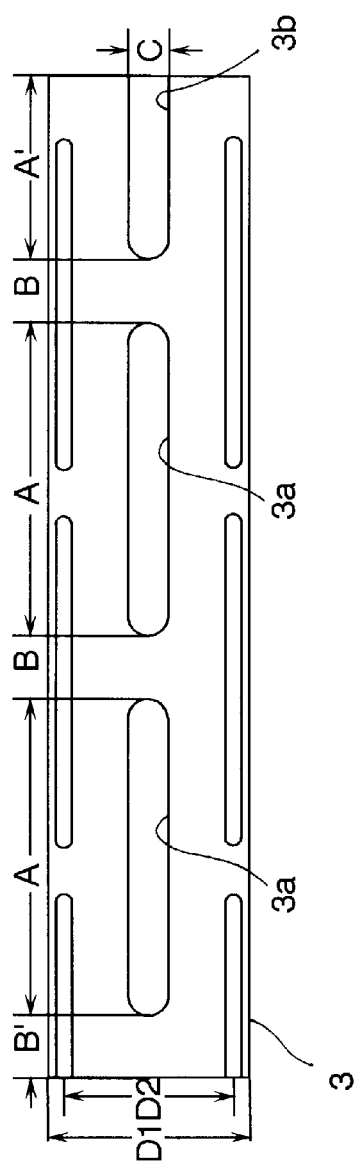
FIG. 7B is a side view showing details of the sleeve connector.

FIGS. 7A and 7B show, by way of example, details of a sleeve connector 3 that is used to mount ceramic or glass ferrules therein in order to interconnect two discrete optical fibers for signal transmission. The sleeve connector 3 is produced using an electroforming process in which a solution of nickel sulfamic acid is used as an electrolyte fluid 32. The sleeve connector 3 is dimensions of a length of 7.253 mm, an external diameter of 1.53 (D1) mm and an internal diameter (D2) of 1.247 mm. The permitted error of internal diameter is between +0 and −0.001 mm. The sleeve connector 3 has six rows of perforations 3a, 3b arranged at circumferential intervals ($\alpha$) of 60°. Each row comprises two complete round-ended perforations 3a and one half perforation 3b arranged at axial intervals (B) of 0.4 mm. The complete perforation 3a has a length (A) of 2.3 mm and a width (C) of 0.3 mm. The half perforation 3b has a length (A') of 1.4 mm and a width (C) of 0.3 mm. The row of perforations 3a, 3b is shifted a distance equal to a half of the pitch pitches (A+B) of 2.7 mm with respect to the adjacent row of perforations 3a, 3b. The sleeve connector 3 having those dimensions has a radial elastic deformation of approximately 1.5 $\mu$m due to an external force applied upon insertion of a ferrule having an external diameter of 1.25 mm. Overall dimensions vary according to the requirements of radial elastic deformation of the sleeve connector.

In operation of mounting ferrules in order to interconnect two discrete optical fibers in close or contacting relationship, at the beginning of insertion of a ferrule into the sleeve connector 3 through one of the opposite ends, the ferrule at the end is slightly deformed in the radial direction in an intended elastic region as it is guided by the inwardly chamfered or rounded end wall and is further forced into the sleeve connector 3. Another ferrule is inserted into the sleeve connector 3 in the same manner. As a result, the insertion of the ferrules is achieved without being accompanied by deformation in an inelastic region and a change in roundness of the sleeve connector 3 This reaches precise axial alignment of the ferules, i.e. a tight joint of two optical fibers together in close or contacting relationship in the sleeve connector 3.

Figure 8:
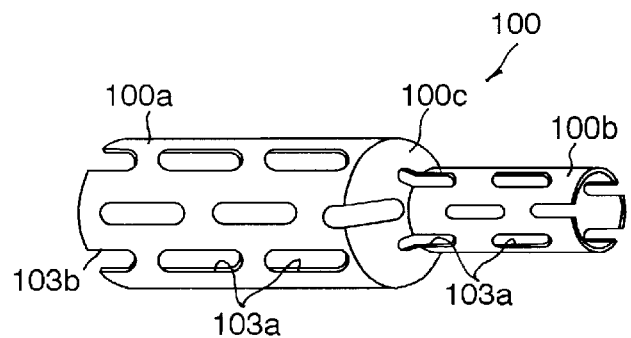
FIG. 8 is a side view of a step sleeve connector in accordance with another preferred embodiment of the present invention.

FIG. 8 shows a step sleeve connector 100 in accordance with another embodiment of the present invention that is produced using an electroforming process, the step sleeve connector 100, that is formed as an integral piece, comprises a large diameter sleeve section 100*a*, a small diameter sleeve section 100*b* and a joint section 100*c* by which the large and small diameter sleeve sections 100*a* and 100*b* are interconnected. The step sleeve connector 100 is formed with a plurality of round-ended perforations 103*a* and half round-ended perforations 103*b* arranged in a predetermined geometric pattern. By way of example, the step elastic sleeve connector 100 has six axial rows of perforations 103*a* and 103*b* arranged at regular circumferential angular intervals of 60°. Each row includes, for example in this embodiment, four complete perforations 103*a* and one half perforation 103*b* arranged at regular axial intervals. These rows of perforations 103*a* and 103*b* are alternately shifted in opposite axial directions so that the half perforations 103*b* alternately extend from opposite ends of the step sleeve connector 100. Accordingly, the step sleeve connector 100 at each of opposite ends is formed with three half perforations 103*b* separated at circumferential angular intervals of 120°.

Figure 9:
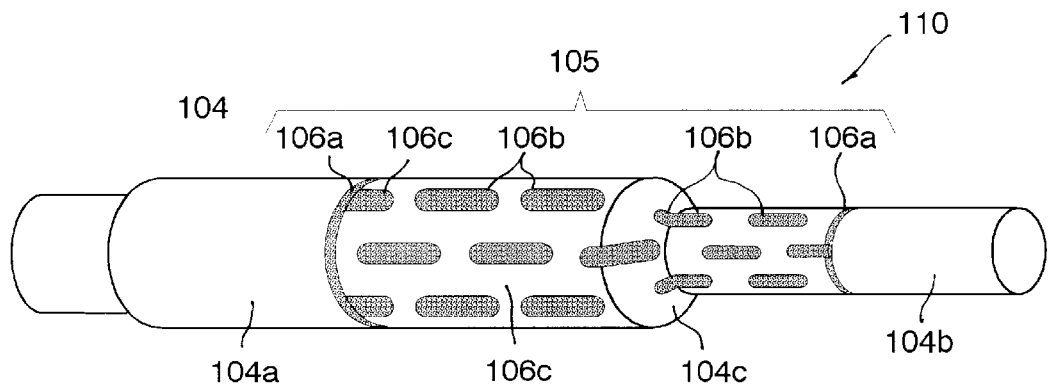
FIG. 9 is a side view of an electroforming mandrel used in an electroforming process of producing the step sleeve connector.
Figure 10A:
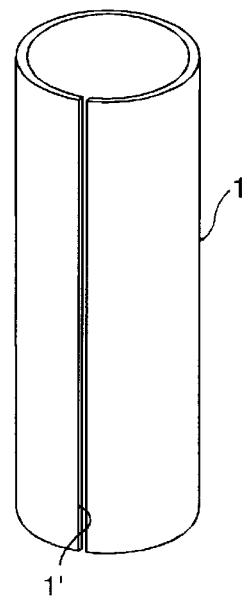
FIG. 10A is a perspective view of a conventional split sleeve connector.
Figure 10B:
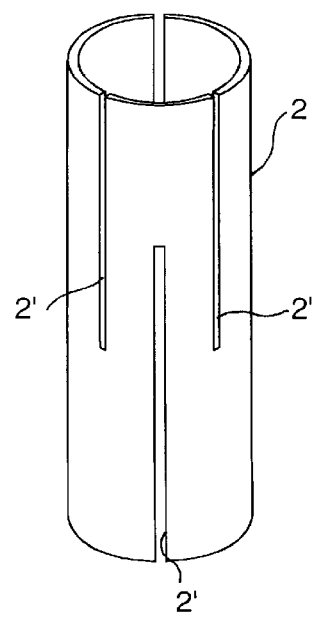
FIG. 10B is a perspective view of another conventional split sleeve connector.

FIG. 9 shows an electroforming mandrel 110 that is used to produce the step sleeve connector 100 shown in FIG. 8. The electroforming mandrel 110 comprises a conductive rod 104 that has a large diameter section 104*a*, a small diameter section 104*b* and a joint section 104*c*, and a non-conductive layer 105 formed in a given pattern on the conductive rod 104. These sections 104*a*–104*c* have external diameters precisely equal to the internal diameters of the corresponding sections of the step sleeve connector 103 and is finished to an external surface texture of a grade as high as meeting a surface texture design requirement such as described in connection with the previous embodiment.

The non-conductive layer 105 is patterned with two non-conductive circumferential annular segments 106*a* separated in an axial direction at a distance equal to a given length of the sleeve connector 103 and six rows of non-conductive round-ended segments 106*b* and 106*c* arranged between the non-conductive circumferential annular segments 106*a*. Each of the complete round-ended segments 106*b* and half round-ended perforations 106*c* has the same configuration as the complete round-ended perforations 103*a* and half round-ended perforation 103*b*, respectively. The six rows of non-conductive round-ended segments 106*b* and 106*c* are arranged at circumferential angular intervals of 60° and alternately shifted in the axial direction so that the half round-ended segments 106*c* are intersected every other row by the circumferential annular segments 106*a*. Accordingly, each row includes four complete round-ended segments 106*b* and one half round-ended segment 106*c*. The half round-ended segments 106*b* alternately appears at each end. The non-conductive layer 105 thus formed has the non-conductive segments 106*b* and 106*c* arranged in the same geometric pattern as the pattern of perforation arrangement of the sleeve connector 103 The part of the conductive rod 104 left bare is a conductive area 106*c* for electrodeposition.

The step sleeve connector 103 is formed on the electroforming mandrel using the electroforming process in the same manner as previously described.

The step sleeve connector 103 can mount cylindrical ceramic or glass ferrules having different diameters to join optical fibers for signal transmission.

As described above, according to the present invention, the sleeve connector formed with perforations provides an increased degree of design freedom for the requirements of clamping force, elasticity and rigidity. In addition, the sleeve connector with perforations is prevented from causing inelastic deformation and a change in roundness even though ferrules are press-fitted, so that optical fibers retained by ferrules are tightly joined together and axially aligned with each other in close or contacting relationship in the sleeve connector. In particular, although the step sleeve connector formed with perforations is forced to deform differently at opposite ends thereof when the ferrules having different diameters are press-fitted, the deformation is elastic and uniform in radial direction, so that the ferrules having different diameters are brought into precise axial alignment with each other in the step sleeve connector.

The sleeve connector formed with perforations as an electroformed metal product has an internal surface finished to dimensions and surface texture transferred from a precisely finished electroforming mandrel. This eliminates the necessity of finishing the internal surface of the sleeve connector additionally and directly. Further, the sleeve connector formed with perforations is produced on an electroforming mandrel with a number of electrodeposit sections defined by a non-conductive layer. This eliminates the necessity of additionally machining the sleeve connector to form perforations in a given pattern in the sleeve connector, to remove flashes that are produced at the opposite end walls and along an edge of the perforation by the additional machining. Accordingly, mass-production of the sleeve connector formed with perforations is realized at low costs by a simple, labor saving and efficient process.

It is to be understood that although the present invention has been described with regard to a preferred embodiment thereof, various other embodiments and variants may occur to those skilled in the art, which are within the scope and spirit of the invention, and such other embodiments and variants are intended to be covered by the following claims.

What is claimed is:

1. A sleeve connector for mounting ferrules retaining optical fibers therein; said sleeve connector being produced on an electroforming mandrel formed with a given pattern of non-conductive layer using an electroforming process, said sleeve connector comprising:

a cylindrical hollow metal tube having an internal diameter and an internal surface texture transferred from said electroforming mandrel; and a plurality of perforations formed in conformity with said given pattern of non-conductive layer in said cylindrical hollow metal tube so as to provide said sleeve connector with elastic deformability in all-round radial directions in a specified elastic region.

2. A sleeve connector as defined in claim 1, wherein said perforations are arranged in a plurality of axial rows.

3. A sleeve connector defined in claim 2, wherein each said row includes a plurality of complete perforations and one half perforation extending from either one of opposite ends of said elastic cylindrical hollow tube.

4. A sleeve connector defined in claim 3, wherein each said complete perforation has round-ended configuration.

5. A sleeve connector defined in claim 3, wherein said cylindrical hollow metal tube has a large internal diameter section, a small internal diameter section and a joint section extending between said large internal diameter section and said small internal diameter section.

6. A sleeve connector defined in claim 3, wherein said joint section inclines with respect to said large internal diameter section and said small internal diameter section.

7. An electroforming process of producing a sleeve connector with a plurality of perforations formed in a given pattern so as to provide the sleeve connector with desired elastic deformability for mounting ferrules retaining optical fibers therein, said process comprising the steps of:

providing an electroforming mandrel made up from a conductive rod with an external surface texture and an external diameter required for an internal surface of the sleeve connector;

forming a non-conductive layer on said electroforming mandrel so as to provide non-conductive segments identical in configuration with said perforations of said sleeve connector and arranged in conformity with said given pattern of perforations of said sleeve connector;

electrodepositing a specified thickness of electroformed metal layer on said electroforming mandrel by an electroforming process; and removing said electroformed metal layer together with said non-conductive layer from said electroforming mandrel, thereby providing a metal tube as said sleeve connector having an internal surface texture and an internal diameter transferred from said electroforming mandrel and elastic deformability in a specified elastic region.

8. An electroforming process as defined in claim 7, wherein said non-conductive layer provides said non-conductive segments for a plurality of said cylindrical sleeve connectors, said non-conductive layer being divided into a plurality of sections for said perforated cylindrical sleeves in an axial direction by non-conductive circumferential annular segments.

* * * * *